(12) United States Patent
Dambrine et al.

(10) Patent No.: US 12,012,867 B2
(45) Date of Patent: Jun. 18, 2024

(54) WOVEN FIBROUS TEXTURE

(71) Applicant: SAFRAN, Paris (FR)

(72) Inventors: Bruno Jacques Gérard Dambrine, Moissy-Cramayel (FR); Dominique Marie Christian Coupe, Moissy-Cramayel (FR); Bastien Tranquart, Moissy-Cramayel (FR)

(73) Assignee: SAFRAN, Paris (FR)

( * ) Notice: Subject to any disclaimer, the term of this patent is extended or adjusted under 35 U.S.C. 154(b) by 393 days.

(21) Appl. No.: 17/416,318

(22) PCT Filed: Nov. 29, 2019

(86) PCT No.: PCT/FR2019/052869
§ 371 (c)(1),
(2) Date: Jun. 18, 2021

(87) PCT Pub. No.: WO2020/128191
PCT Pub. Date: Jun. 25, 2020

(65) Prior Publication Data
US 2022/0065112 A1    Mar. 3, 2022

(30) Foreign Application Priority Data
Dec. 21, 2018 (FR) ...................................... 1873865

(51) Int. Cl.
*F01D 5/28* (2006.01)
*D03D 15/275* (2021.01)
*D03D 25/00* (2006.01)

(52) U.S. Cl.
CPC ........... *F01D 5/282* (2013.01); *D03D 15/275* (2021.01); *D03D 25/005* (2013.01); *D10B 2505/02* (2013.01); *F05D 2220/36* (2013.01)

(58) Field of Classification Search
CPC ... F01D 5/282; F01D 5/16; F01D 5/20; F01D 5/147; D03C 15/275; D03D 25/005;
(Continued)

(56) References Cited

U.S. PATENT DOCUMENTS 8,500,410 B2    8/2013   De Moura et al.
2009/0074586 A1  3/2009   Le et al.

FOREIGN PATENT DOCUMENTS

FR              2 964 426 A1   3/2012
WO       WO 2006/136755 A2   12/2006

OTHER PUBLICATIONS

International Search Report as issued in International Patent Application No. PCT/FR2019/052869, dated May 20, 2020.

*Primary Examiner* — Camie S Thompson
(74) *Attorney, Agent, or Firm* — Pillsbury Winthrop Shaw Pitman LLP

(57) ABSTRACT

A fibrous texture intended to form the fibrous reinforcement of a turbomachine part, includes first yarns bonded with second yarns, and at least one vibration damping element of viscoelastic material present in a recess defined by a second de-bonding zone, the de-bonding zone separating, on a portion of the texture, a first surface part of the texture from a second part of the texture formed by a three-dimensional fabric in which the first yarns are bonded with the second yarns, the first surface part of the texture being formed by a unidimensional layer of first yarns or being formed by a two-dimensional fabric in which the first yarns are bonded with the second yarns.

13 Claims, 3 Drawing Sheets

(58) Field of Classification Search
CPC ....... D10B 2505/02; B64C 11/26; F02K 3/02;
F02K 3/06; F02K 3/072; F04D 29/38;
F04D 29/66; F04D 29/324; F04D 29/388;
F04D 29/666; F02C 3/067; B64D
2027/026; F05D 2260/96; F05D
2300/603; Y02T 50/60; B29C 70/24;
B29L 2031/082
USPC ........................................................ 442/218
See application file for complete search history.

[Fig. 1]
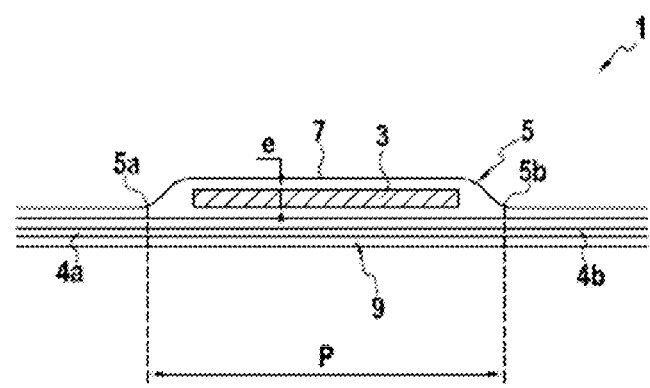
[Fig. 2]
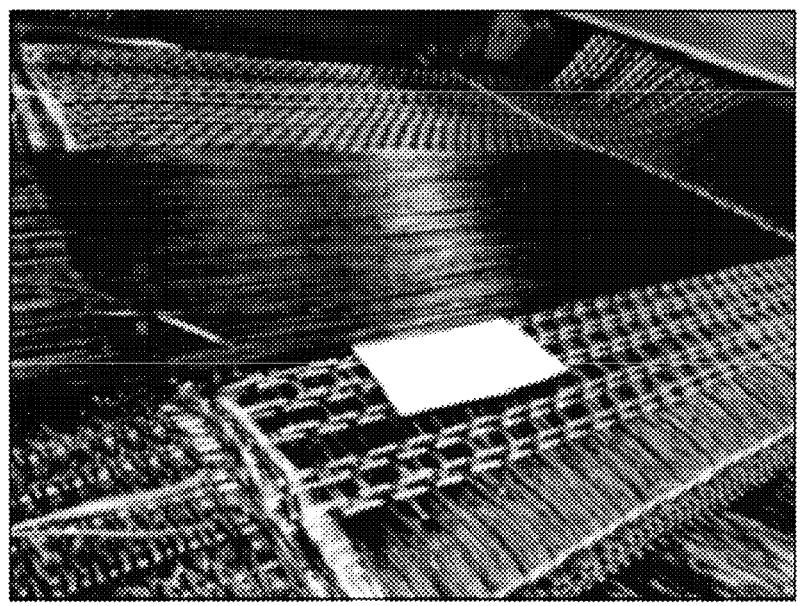

[Fig.3]
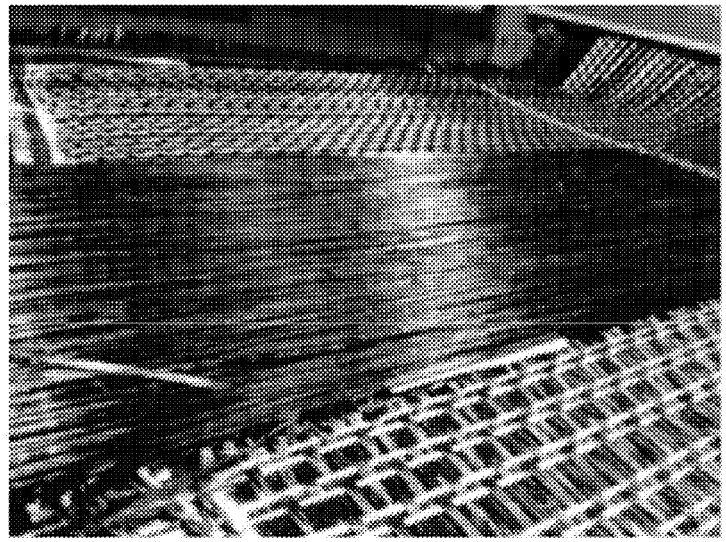
[Fig.4]
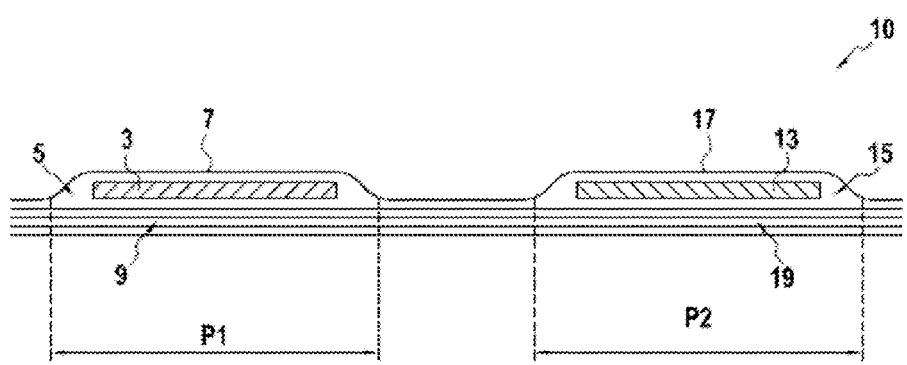

[Fig. 5]
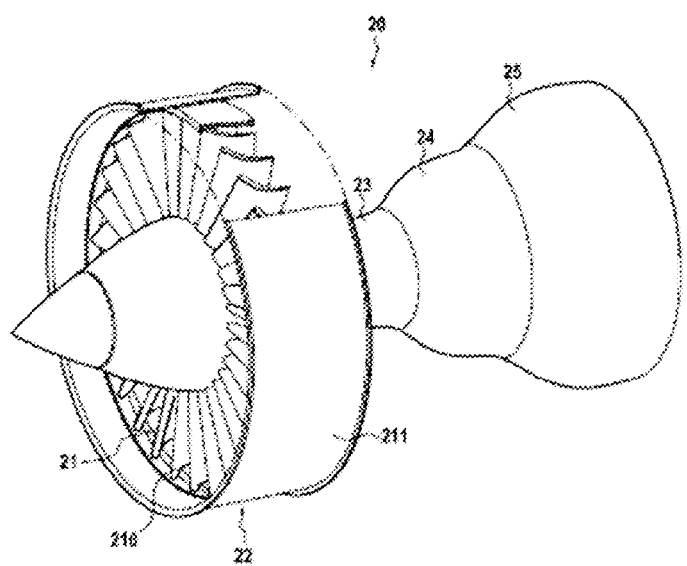

WOVEN FIBROUS TEXTURE

CROSS-REFERENCE TO RELATED APPLICATIONS

This application is the U.S. National Stage of PCT/FR2019/052869, filed Nov. 29, 2019, which in turn claims priority to French patent application number 1873 865 filed Dec. 21, 2018. The content of these applications are incorporated herein by reference in their entireties.

TECHNICAL FIELD

The present invention concerns a woven fibrous texture comprising at least one vibration damping element of viscoelastic material, as well as a turbomachine part of composite material incorporating this fibrous texture.

PRIOR ART

Structural damping is always a concern in turbomachines and especially in rotating parts.

Fan blades, composite or otherwise, are subjected to engine excitations. During frequency coincidences, vibrational stress levels may lead to resizing the blade, often to the detriment of performance.

Increasing vibration damping in a structure allows improving performances in general, and more particularly aerodynamic performances (pumping margin, float) and mechanical performances (high cycle fatigue).

It is desirable that the solution employed to increase vibration damping does not penalize structure mass.

DISCLOSURE OF THE INVENTION

According to a first aspect, the invention relates to a fibrous texture intended to form the fibrous reinforcement of a turbomachine part, comprising first yarns bonded with second yarns, the texture being characterized in that it comprises at least one vibration damping element of viscoelastic material present in a recess defined by a de-bonding zone, said de-bonding zone separating, on a portion of the texture, a first surface part of the texture from a second part of the texture formed by a three-dimensional fabric in which the first yarns are bonded with the second yarns, the first surface part of the texture being formed by a unidimensional layer of first yarns or being formed by a two-dimensional fabric in which the first yarns are bonded with the second yarns.

The first part has a stiffness greater than that exhibited by the second part of the texture in 3D fabric. The fact that the damping element of viscoelastic material is interposed between these two parts that have different stiffnesses advantageously makes it possible to shear this element, thus increasing the dissipation in the portion of the texture considered and inducing an increase in damping. This solution thus makes it possible to dissipate vibrational energy without penalizing texture mass.

In one example of embodiment, the texture also comprises a second vibration damping element of a second viscoelastic material present in a second recess defined by a second de-bonding zone, said second de-bonding zone separating, on a second portion of the texture, a third surface part of the texture from a fourth part of the texture formed by a second three-dimensional fabric in which the first yarns are bonded with the second yarns, the third surface part of the texture being formed by a second unidimensional layer of first yarns or being formed by a second two-dimensional fabric in which the first yarns are bonded with the second yarns.

Such a characteristic is advantageous when it is desirable to disperse vibrational energy in different portions of the texture.

In one example of embodiment, each damping element exhibits a shear loss factor greater than or equal to 0.2 over the temperature range comprised between −50° C. and 120° C., the shear loss factor being determined by imposing a sinusoidal shear stress of frequency equal to 100 Hz. The shear loss factor of a material is, in a manner known per se, the ratio between the imaginary part of its complex shear module and the real part of its complex shear module. The shear loss factor corresponds to the tangent of the phase shift of the deformation undergone by the material with respect to the shear stress, this factor quantifying the quantity of energy absorbed by the material upon its deformation under this stress.

Such a characteristic advantageously makes it possible to further dissipate vibrational energy.

The shear loss factor of each damping element can be, in particular, greater than or equal to 0.4.

In one example of embodiment, each vibration damping element comprises an elastomer material. The elastomer material may or may not be filled, for example with carbon. According to one example, an elastomer material, filled or unfilled, can be used as a damping element, supported by a fibrous structure such as a unidimensional yarn layer or a fabric, said layer or said fabric being, for example, of carbon yarns. Such a characteristic makes it easier to manipulate the damping element and insert it into the fibrous texture. By way of nonlimiting example, the elastomeric material may for example be a crosslinked elastomer, natural rubber (NR), synthetic rubber (IR), polybutadiene (BR), styrene-butadiene (SBR), acrylonitrile-butadiene (NBR), ethylene-propylene-diene (EPDM), polyurethane (PU/EU), polychloroprene (CR), isobutylene-isoprene (IIR), silicone (polysiloxane) (SI), fluoroelastomer (FKM/FPM), perfluoroelastomer (FFKM), fluorosilicone, chlorosulphonated polyethylene (CSM), epichlorhydrin (CO/ECO), nitrile rubber (NBR), epoxy-terminated nitrile rubber (ETBN), carboxylated polybutadiene (CTBN), or else amino-terminated nitrile rubber (ATBN). The elastomeric material can also be acrylonitrile butadiene styrene (ABS), polyamide (PA), polyetheretherketone (PEEK), or polyetherimide (PEI).

In one example of embodiment, each vibration damping element has a flat shape.

In one example of embodiment, the first part of the texture surface is formed by a unidimensional layer of first yarns, the first yarns of this unidimensional layer being held in position by a holding element.

The use of such a holding element is advantageous when a unidimensional layer is used as the first surface part in order to avoid any risk that the first yarns deviate from the desired direction of stress thereof. This confers a maximum stiffness to the first part in order to optimize the dissipation of vibrational energy.

The holding element can be a hot melt element or an adhesive. The adhesive can be deposited on the yarns of the first part by means of an applicator or can be sprayed on these yarns. In the case of a hot melt material, the yarns of the unidimensional layer are held in place by melting of the hot melt material to impregnate the yarns with the melted material and then solidification of this material in order to bond the impregnated yarns and hold them in position. The hot melt element can be in the form of a powder composition, a web of material or a plurality of yarns. The hot melt element can comprise, for example, a thermoplastic polymer. In the case where the third part of the texture surface is formed by a second unidimensional layer of first yarn, these yarns can be held by a holding element, similar to what has just been described.

In one example of embodiment, the first yarn and second yarn are of carbon fibers.

The invention also relates to a turbomachine part of composite material comprising a fibrous reinforcement formed by a texture such as described above and a matrix densifying said fibrous reinforcement.

In one example of embodiment, the matrix is an organic matrix.

In one example of embodiment, the part is an aircraft engine fan part. In particular the part can be an aircraft engine fan blade or an aircraft engine fan casing.

The invention also relates to a turbomachine comprising a part such as described above.

BRIEF DESCRIPTION OF THE DRAWINGS

FIG. 1 is a partial sectional schematic view of a first example of the fibrous texture according to the invention.

FIG. 2 is a photograph of an example of the texture according to FIG. 1, showing the damping element partially inserted in the recess defined by the de-bonding zone.

FIG. 3 is a photograph of an example of the texture according to FIG. 1, showing the damping element entirely inserted in the recess defined by the de-bonding zone.

FIG. 4 is a partial sectional schematic view of a second example of the fibrous texture according to the invention.

FIG. 5 is a perspective view of an aircraft engine according to one embodiment of the invention.

DESCRIPTION OF EMBODIMENTS

In the following, the expression "vibration damping element" will be designated by the expression "damping element" for brevity.

FIG. 1 shows a first example of woven fibrous texture 1 according to the invention. This fibrous texture 1 is woven in a single piece and comprises first yarns woven with second yarns.

The first yarns can be warp yarns and the second yarns can be weft yarns or, conversely, the first yarns can be weft yarns and the second yarns can be warp yarns. For all useful purposes, it is specified that, unless otherwise stated, the roles of the warp and weft can be reversed in the present text, and should be considered as also covered by the claims.

Fibrous texture 1 comprises a damping element 3 of viscoelastic material that is present in a recess 5 defined by a de-bonding zone of texture 1.

The de-bonding zone defining recess 5 corresponds to a zone defined by a first de-bonding limit 5a and a second de-bonding limit 5b. The de-bonding zone extends over a portion P that is located between an upstream portion 4a of texture 1 and a downstream portion 4b of texture 1.

The de-bonding zone separates, on portion P of texture 1, a first surface part 7 of the texture from a second part 9 of the texture formed by a three-dimensional fabric in which the first yarns are woven with the second yarns. The first part of the texture surface is formed by a unidimensional layer of first yarns or by a two-dimensional fabric in which the first yarns are bonded with the second yarns.

"Three-dimensional fabric" should be understood to mean a weaving method by which at least some of the first yarns bind together the second yarns belonging to different second yarn layers. The three-dimensional fabric can be an interlock weave, multi-satin or multi-plain, as especially described in document WO 2006/136755.

This section concerns the alternative where first part 7 is formed by a unidimensional layer of first yarns. In this case, the first yarns are not woven with the second yarns in first part 7. First part 7 comprises only first yarns extending essentially in the same direction. First part 7 comprises a single layer of first yarns. First part 7 does not comprise second yarn. As indicated above, the first yarns can be held in position in this case by a hot melt element, for example.

According to a variant, first part 7 comprises first yarns and second yarns, these first and second yarns being woven together according to a two-dimensional weaving pattern in first part 7.

First part 7 extends between first limit 5a and second limit 5b. First part 7, the de-bonding zone, and second part 9 can be superimposed along the thickness of fibrous texture 1.

In upstream portion 4a, the first yarns bind the second yarns, with a three-dimensional weaving pattern, for example an interlock weave, multi-satin or multi-plain. In downstream portion 4b, the first yarns bind the second yarns, with a three-dimensional weaving pattern, for example an interlock weave, multi-satin or multi-plain. The weaving pattern is not necessarily the same in upstream portion 4a and downstream portion 4b. In portion P, the first yarns are separated into two subsets: the first subset of first yarns is present in first part 7 and the second subset of first yarns is woven with the second yarns in second part 9. This separation of first yarns into these two subsets is initiated at first de-bonding limit 5a and is terminated at second de-bonding limit 5b.

The stiffness of first part 7, measured along the axis of elongation of the first yarns in this part, can be greater than or equal to 75 GPa, for example greater than or equal to 150 GPa. Unless otherwise stated, the stiffness values are taken at the temperature of 20° C.

The stiffness of second part 9, measured along the axis of elongation of the first yarns in this part, can be less than or equal to 110 GPa. The thickness of second part 9 is greater than the thickness of first part 7, for example greater than or equal to 5 times the thickness of first part 7.

Damping element 3 is present between first part 7 and second part 9. Damping element 3 can be in contact with first part 7 and second part 9. Damping element 3 is clamped between first part 7 and second part 9. Thickness e of the damping element can be greater than or equal to 0.1, for example comprised between 0.1 mm and 2 mm. Damping element 3 can have a flat shape, before any shaping of the texture to the shape of the part. Damping element 3 can be in the form of a patch. The damping element can comprise an elastomer material as stated above.

Damping element 3 can be present over at least a quarter, or even over at least half and, for example, over at least three-quarters, of a larger dimension of recess 5.

According to one example of embodiment, a damping element 3 can be used comprising an elastomer and having a thickness equal to 0.2 mm inside a texture 1 of carbon fibers for which the stiffness of first part 7 is equal to 190 GPa, and the stiffness of second part 9 is equal to 90 GPa.

FIGS. 2 and 3 are photographs of the texture according to FIG. 1 showing the damping element (in white) interposed between the first and second texture part. FIG. 2 shows the damping element partially out of the recess and FIG. 3 shows the damping element entirely inside the recess.

We will now describe the manufacturing steps for the example of texture 1 of FIG. 1, as well as a part of composite material incorporating such a texture. It is understood that this description of manufacturing applies mutatis mutandis to the example of texture 10 that will be described below in connection with FIG. 4.

The fibrous texture is first created by weaving. When weaving texture 1, the weaving between a part of the first yarns and the second yarns can be interrupted from first limit 5a or be modified to form first part 7. The weaving between this first yarn part and the second yarns can then be resumed from second limit 5b.

The set of first yarns present in upstream portion 4a of texture 1 is thus divided during weaving into two subsets of first yarns from first limit 5a. The first subset of first yarns is present in first part 7 and the second subset of first yarns binds the second yarns in second part 9. The first subset of first yarns may not be bonded with the second yarns in portion P or as a variant, be bonded with the second yarns so as to form a two-dimensional fabric. Beyond second limit 5b, the first yarns of the first subset bind the second yarns in downstream portion 4b.

This de-bonding allows defining a recess located between first limit 5a and second limit 5b, which separates first part 7 from second part 9. Damping element 3 is then inserted in recess 5 thus obtained, between first part 7 and second part 9.

Then, if necessary, a step of shaping texture 1 provided with damping element 3 is performed. As a variant, this shaping step is omitted, texture 1 being directly woven in the desired form.

Then a matrix is formed in the porosity of texture 1, optionally shaped, in order to densify it and obtain a composite material part.

The formation of the matrix in the porosity of fibrous texture 1 is done in a manner known per se.

The nature of the matrix is chosen according to the application considered. The matrix can be an organic matrix obtained, notably, from a precursor resin such as an epoxy, bismaleimide or polyimide resin, or a carbon matrix or a ceramic matrix. In the case of an organic matrix, the fibrous texture is impregnated with the matrix precursor resin; this impregnation can be performed by injection, for example by resin transfer moulding (RTM).

In the case of a carbon or ceramic matrix, the densification can be done by chemical vapor infiltration (CVI) or by impregnation with a liquid composition containing a carbon or ceramic precursor resin and heat treatment for pyrolysis of the precursor, these methods being known p.

FIG. 4 shows a second example of texture 10 according to the invention that comprises a plurality of damping elements 3 and 13 of viscoelastic material each positioned in a separate recess 5 or 15.

According to the example of FIG. 4, a first damping element 3 is present on a first portion P1 of texture 10 and a second damping element 13 is present on a second portion P2 of texture 10, spaced from first portion P1. First portion P1 and second portion P2 are disjoint here. First damping element 3 can be identical to second damping element 13. As a variant, first and second damping elements 3 and 13 can differ at least by their material, size and/or shape.

Second damping element 13 is present in a second recess 15 defined by a second de-bonding zone of texture 10, said second de-bonding zone separating, on a second portion P2 of texture 10, a third surface part 17 of texture 10 from a fourth part 19 of the texture formed by a three-dimensional fabric in which the first yarns are woven with the second yarns, the third surface part of the texture being formed by a second unidimensional layer of first yarns or by a second two-dimensional fabric in which the first yarns are bonded with the second yarns.

The characteristics that have just been described in connection with FIG. 1 remain applicable to recesses 5 and 15, to parts 7, 9, 17 and 19 and to damping elements 3 and 13 of the example of FIG. 4.

FIG. 5 shows a perspective view of an aircraft gas turbomachine 20. Such an engine, as shown very schematically by FIG. 5, comprises, in the direction of gas flow, a fan 21 positioned at the entrance of the engine, a compressor 22, a combustion chamber 23, a high pressure turbine 24 and a low pressure turbine 25. Fan 21 comprises a plurality of fan blades 210 surrounded by a casing 211.

According to one embodiment, the turbomachine part incorporating fibrous texture 1 or 10 described above can constitute casing 211 and/or fan blades 210.

The expression "comprised between . . . and . . . " should be understood as including the limits.

The invention claimed is:

1. A woven fibrous structure intended to form a fibrous reinforcement of a turbomachine part, comprising first yarns bonded with second yarns, and at least one vibration damping element of viscoelastic material present in a recess defined by a de-bonding zone, said de-bonding zone separating, on a portion of the woven fibrous structure, a first surface part of the woven fibrous structure from a second part of the woven fibrous structure, wherein the first surface part of the woven fibrous structure is formed by a unidimensional layer of first yarns only comprising first yarns extending essentially in a same direction, or by a two-dimensional fabric in which the first yarns are bonded with the second yarns and wherein the second part of the woven fibrous structure is formed by a three-dimensional fabric in which the first yarns are bonded with the second yarns.

2. The woven fibrous structure according to claim 1, wherein the woven fibrous structure comprises a second vibration damping element of a second viscoelastic material present in a second recess defined by a second de-bonding zone, said second de-bonding zone separating, on a second portion of the structure, a third surface part of the structure from a fourth part of the texture formed by a three-dimensional fabric in which the first yarns are bonded with the second yarns, the third surface part of the structure being formed by a second unidimensional layer of first yarns only comprising first yarns extending essentially in the same direction, or being formed by a second two-dimensional fabric in which the first yarns are bonded with the second yarns.

3. The woven fibrous structure according to claim 1, wherein each damping element exhibits a shear loss factor greater than or equal to 0.2 over the temperature range comprised between $-50°$ C. and $120°$ C., the shear loss factor being determined by imposing a sinusoidal shear stress of frequency equal to 100 Hz.

4. The woven fibrous structure according to claim 1, wherein each vibration damping element comprises an elastomer material.

5. The woven fibrous structure according to claim 4, wherein each vibration damping element is an elastomer material supported by a fibrous support.

6. The woven fibrous structure according to claim 1, wherein each vibration damping element has a flat shape.

7. The woven fibrous structure according claim 1, wherein the first surface part of the woven fibrous structure is formed by a unidimensional layer of first yarns and wherein the first yarns of this unidimensional layer are held in position by a holding element.

8. The woven fibrous structure according to claim 7, wherein the holding element is hot meltable.

9. The woven fibrous structure according to claim 1, wherein the first yarns and the second yarns are of carbon fibers.

10. A turbomachine part of composite material comprising a fibrous reinforcement formed by a structure according to claim 1 and a matrix densifying said fibrous reinforcement.

11. The turbomachine part according to claim 10, wherein the matrix is an organic matrix.

12. The turbomachine part according to claim 10, wherein the part is a fan part of an aircraft engine.

13. A turbomachine comprising a turbomachine part according to claim 10.

* * * * *